United States Patent Office 3,413,261
Patented Nov. 26, 1968

3,413,261
POLYMERCAPTAN RESIN STABILIZATION
Edmund Schalin, Mentor, Kirsten V. Schou, Euclid, and Frank R. Voigstadt, Painesville, Ohio, assignors to Diamond Shamrock Corporation, a corporation of Delaware
No Drawing. Filed June 30, 1966, Ser. No. 561,715
6 Claims. (Cl. 260—45.9)

ABSTRACT OF THE DISCLOSURE

A polymercaptan resin and method of preparing said resin are presented, with the resin having storage stability from stabilizing amounts of an aromatic antioxidant which is soluble in the resin.

---

This invention relates to stabilized resinous compositions and to their preparation, and more particularly relates to liquid resinous compositions containing polymercaptan resin and an antioxidant.

Heretofore, polymercaptan resins, and especially those which are most useful in preparing sealants and calking compositions, have often suffered, following storage, from a poor cure hardness in subsequent use. Additionally, such resins have often displayed a deleterious viscosity increase in only a few months' storage time.

It has now been found that polymercaptan resins can be mixed with antioxidants to obtain enhanced storage stability, even though such resins, independently, are efficacious antioxidants. Resulting stabilized resins have enhanced cure hardness on use and suppressed viscosity increase during storage. Such stabilized resins can generally be stored for one to two years or longer, as compared with a shelf-life of only a few months or less for freshly prepared, antioxidant-free resin.

Moreover, in curing the stabilized resins, e.g., with such conventional agents as lead dioxide, ammonium dichromate, cumene hydroperoxide, and other noteworthy oxidizing agents, it has unexpectedly been found that antioxidant-stabilized resins do not retard the cure obtained from these oxidizing agents. Thus the antioxidant-stabilized resins do not require additional quantities of oxidative curing catalyst. Furthermore, even when using such manifest oxidizing agents for curing, in amounts which ostensibly would mask further antioxidant benefits, cured products nevertheless exhibit enhanced weathering resistance, e.g., enhanced resistance to undesirable chalking and surface crazing.

Broadly, this invention relates to a liquid resinous composition comprising a polymercaptan resin having a number average molecular weight of about 800–10,000 and an SH functionality greater than two, and a stabilizing amount of one or more aromatic antioxidants selected from the group consisting of di-β-naphthyl-p-phenylene diamine, p-benzoquinone, ring substituted p-benzoquinone, and compounds corresponding to the formula:

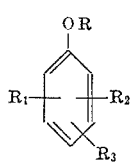

wherein R is hydrogen or methyl and $R_1$, $R_2$, and $R_3$ are hydrogen, hydroxyl, alkoxy, phenoxy, amino, hydroxyalkyl, carboalkoxy, carboxyl, alkyl, dialkylamino, acyl-amido, and not more than one radical corresponding to the formula:

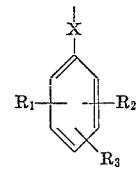

where X is alkylene or thio and $R_1$, $R_2$, and $R_3$ are as defined above.

One aspect of this invention is the stabilization of polymercaptan resin prepared from a halogenated polyhydric polyether obtained from a polyoxyalkylene-modified polyhydric alcohol reacted with a halogen-containing epoxide.

Another aspect of this invention is the method of preparing stabilized liquid polymercaptan resin by blending such resin with one or more of the above-defined aromatic antioxidants.

The polymercaptan resin component of the composition must have an SH functionality greater than two, that is, it must have an average of greater than two —SH groups per resin molecule. Additionally, the resin must be virtually free from molecules bearing only one —SH group, so that the molecules of the polymercaptan resin component must contain two or more, e.g., up to 10, —SH groups per molecule. Compositions containing resin molecules which have only one —SH group per molecule, or which have virtually all resin molecules containing just two —SH groups, are generally fluid after curing and can be subject to cold flow after application. Advantageously, for preparing cured products of enhanced resistance to cold flow which also have desirable tensile strength for use in sealing and calking compositions, a resin is used which has an SH functionality between about 2.1–9. Additionally, the polymercaptan resin components should have a number average molecular weight between about 800–10,000. Resins having an SH functionality greater than two, but which have molecular weight below about 800, form products of retarded elasticity, which can be undesirable in sealants, while resins having molecular weight above about 10,000 can be highly viscous, and can be difficult to formulate with fillers, pigments, and the like.

Exemplary resins for the polymercaptan component, which resins after storage often can exhibit an undesirable cure hardness in a period of only six months or less when stored without a stabilizing amount of antioxidant, are those resins prepared from polyepoxides having an epoxy equivalency greater than two, i.e., the number of epoxy groups contained in the average polyepoxide molecule is greater than two. Such polyepoxides can be employed in preparing the polymercaptan resin by reation with hydrogen sulfide, or by first converting epoxide groups to halohydrin groups and thereafter reacting the halohydrin groups with a metallic sulfhydrate such as sodium sulfhydrate or potassium sulfhydrate.

Examples of the polyepoxides which can be used in forming the polymercaptan resin include the polyepoxy-containing polymeric reaction products of a halogen-containing epoxide with an aliphatic polyhydric alcohol, e.g., glycerol, pentaerythritol, 1,2,6-hexanetriol, or 1,3,5-pentanetriol wherein a portion of the halogen containing epoxide can be formed from an aromatic polyhydric phenol such as resorcinol, catechol, or bis-phenol, and a halogen-containing epoxide such as an epihalohydrin or 3-chloro-1,2-epoxybutane. Further exemplary polyepoxides are those obtained by reacting a polyhydric phenol with a polyepoxide compound such as bis(2,3-epoxypropyl) ether, or bis(2,3-epoxy-2-methylpropyl) ether, or those obtained as the reaction product of such a polyepoxide compound with an aliphatic polyhydric alcohol.

Another serviceable group of polyepoxides include esters of epoxy acids and polyhydric alcohols, or phenols, containing three or more hydroxyl groups, for example, esters of 2,3-epoxypropionic acid reacted with glycerol (or with 1,2,6-hexanetriol) and esters of 3,4-epoxybutanoic acid and polyvinyl alcohol. Other suitable polyepoxides are those esters of epoxy alcohols and polycarboxylic acids containing three or more carboxylic groups, e.g., triglycidyl ester of 1,2,4-butanetricarboxylic acid, triglycidyl esters of 1,3,6-hexanetricarboxylic acid, and glycidyl ester of pyromellitic acid.

Polymercaptan resins which generally are present in mixture with polymercaptans formed from the above described polyepoxide precursors and which, for economy and efficiency, advantageously form only about 20 weight percent or less of the total polymercaptan resin component include resins prepared from the reaction of hydrogen sulfide with polythiuranes. Other such polymercaptan resins which generally are mixed with the polymercaptans derived from the above described polyepoxide precursors, include the epoxidized polymers and copolymers of compounds such as isoprene and butadiene which have been reacted with hydrogen sulfide, as well as mercaptoethyl esters of polyacrylic acid and mercaptobutyl esters of copolymers prepared from methacrylic acid and styrene.

The especially preferred polymercaptan resins, for economy, are those prepared by initially reacting a polyhydric alcohol, such as 1,2,6-hexanetriol, glycerol, trimethylol propane, or pentaerythritol, with an alkylene oxide, for example propylene oxide or ethylene oxide, there usually being a substantial molar excess of alkylene oxide present during reaction, and thereafter reacting the resulting polyoxyalkylene-modified polyhydric alcohol with a halogen containing epoxide, e.g., an epihalohydrin or 3-chloro-1,2-epoxy-butane, to prepare a halogenated polyhydric polyether, and finally preparing the corresponding mercaptan polymer of such halogenated polyhydric polyether. Such especially preferred resins include those which have been shown in Belgium Patent No. 636,248. These especially preferred resins usually have a number average molecular weight within the range from about 1,000 to about 7,000 and SH functionality between about 2.1 and about 6.

The stabilizing antioxidants for the polymercaptan resin are those which are soluble in the resin, that is, when used in a stabilizing amount, a substantial portion of the antioxidant will dissolve in the resin at a temperature of about 20° C. and at a pressure of about 760 mm. Hg absolute. Essentially all of the antioxidants which are listed hereinbelow, when blended in stabilizing amounts with the polymercaptan resin at room temperature, i.e., about 20° C., will undergo virtually complete solution in the resin under the influence of only gentle agitation.

The antioxidants must additionally be inert to the resin at temperatures encountered during storage and handling of the resin, e.g., within a temperature range from about −40° to about 150° F., i.e., these solutes must not be capable of chemically combining with reactive groups of the resin. Otherwise, the ensuing chemical reaction can impair the stability of the composition or provide a composition which will be subject to cold flow after curing. For enhanced storage stability of the polymercaptan resin, the antioxidant is preferably one of low volatility, that is, the antioxidant preferably has a boiling point above about 100° C. at a pressure at 760 mm. Hg absolute. However, more volatile antioxidants are serviceable, particularly when caution is exercised to prevent exposure to elevated storage temperatures, for example above about 150° F., and to prevent extended storage periods, such as longer than about two years.

In addition to the servicable di-β-naphthyl-p-phenylene diamine, aromatic antioxidants include compounds which correspond to the formula:

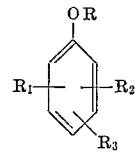

wherein R is hydrogen or methyl and $R_1$, $R_2$, and $R_3$ are hydrogen, hydroxyl, alkoxy, phenoxy, amino, hydroxyalkyl, carboalkoxy, carboxyl, alkyl, dialkylamino (i.e., $(R')_2N$—, wherein R' is alkyl) acylamido (i.e., R″CONH—, wherein R″ is alkyl or aryl), and not more than one substituent corresponding to the formula:

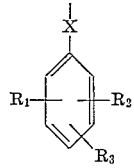

wherein $R_1$, $R_2$, and $R_3$ are as defined hereinabove, and X is alkylene as in 2,2'-methylene bis(4-methyl-6-tert-butyl phenol), or X is thio as in 2,2'-thiobis(4-methyl-6-tert-butyl phenol).

Typical antioxidants which are suitable for use in this invention and which are represented by the above formula include 2,6-di-tert-butyl-p-cresol, 2,6-di-tert-butyl phenol, hydroquinone, 2,6-di-tert-butyl-α-dimethylamino-p-cresol, 2,6-di-tert-butyl-α-methoxy-p-cresol, p-methoxyaniline, N-acetyl-p-aminophenol, N-butyryl-p-aminophenol, N-lauroyl-p-aminophenol, N-stearoyl-p-aminophenol, 2,4-dimethyl-6-tert-butylphenol, p-tert-butylphenol, 6-tert-butyl-2,4-xylenol, 2,6-di-tert-butyl-4-hydroxymethylphenol, hydroquinone monobenzyl ether, methoxybenzene, and hydroquinone monomethyl ether.

Additional suitable aromatic antioxidants include p-benzoquinone and ring substituted p-benzoquinones. By the use of the term "ring substituted p-benzoquinone" is meant a halo, phenyl, hydroxyl, or alkyl substituted p-benzoquinone corresponding to the formula:

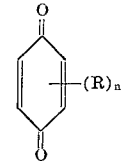

wherein when n is 1-4, R is hydroxyl, alkyl (for example a lower alkyl having six carbon atoms or less), halogen having atomic weight between about 35-127, or mixtures of these radicals (when $n$ is 2-4) such as 6-bromo-2-methyl-p-benzoquinone. Additionally, $R_n$ can represent one or two phenyl substituents. Representative ring substituted p-benzoquinones corresponding to the above formula include 2,6-dichloro-p-benzoquinone, trichloro-p-benzoquinone, tetrachloro-p-benzoquinone, 2,5-dihydroxy-p-benzoquinone, tetrahydroxy-p-benzoquinone, 2-methyl-p-benzoquinone, 2,3-dimethyl-p-benzoquinone, 2,5-dimethyl-p-benzoquinone, 2,6-dimethyl-p-benzoquinone, tetramethyl-p-benzoquinone, and 2,5-diphenyl-p-benzoquinone.

Virtually all of the antioxidants which are advantageous in preparing liquid polymercaptan resin solutions of enhanced stability, are also those substances contributing to the enhanced performance of resinous solutions, and cured products prepared therefrom, after such solutions are subjected to the hereinbelow described hydrogen peroxide procedure. It has been found that the changes in the characteristics of the polymercaptan resin, such as changes in resin viscosity, SH functionality, and hardness after curing, which accompany resin aging, can be essentially duplicated by a hydrogen peroxide test. Thus, antioxidants can usually be conveniently observed without lengthy storage testing, e.g., the deleterious aging changes taking place in the resin from about four weeks' storage, generally at an elevated temperature of about 120–170° F., can be essentially duplicated in a few hours from the peroxide test.

Typically, in this accelerated test, a 30 percent aqueous solution of hydrogen peroxide is used for economy, and the weight proportion of resinous solution to hydrogen peroxide is between about 50:0.1 to about 33:0.1. A weight proportion of resinous solution to hydrogen peroxide of greater than about 50:0.1 will generally not provide sufficient hydrogen peroxide to essentially duplicate the deleterious storage changes, while a weight proportion of resinous solution to hydrogen peroxide of less than about 33:0.1 can yield subsequent resinous masses which will not provide useful data, for example, such masses can be too fluid after curing to provide comparative hardness data. Preferably, to obtain the most significant data, i.e., data resulting from normal storage, the weight proportion of resinous solution to hydrogen peroxide is between about 42:0.1 to 38:0.1.

This peroxide-containing mixture is then maintained at a temperature of about 65–75° C. for at least about 4 hours, and advantageously, to insure reaction efficiency, for about 6–18 hours, and the resulting material is subsequently cured. The advantageous antioxidants for enhancing the stability of polymercaptan resins are those which yield cured elastomers, from the peroxide-tested mixtures, which retain at least about 50 percent of the hardness achieved by cured products from identical resinous solutions (often freshly prepared only a few days, or less, before curing), except that these identical solutions have not been subjected, prior to cure, to the peroxide test.

For convenience, the comparative resin solutions which are cured without being subjected to the accelerating peroxide test, are usually referred to herein as being "peroxide-free" solutions, while those solutions which have been subjected to the peroxide test are generally referred to herein as "peroxide-containing" solutions. Preferably for enhanced stability, the antioxidant is one which will prepare cured products from peroxide-containing mixtures, which products achieve at least about an 80 percent comparative hardness.

In curing both the peroxide-containing resinous mixture or the comparative peroxide-free resinous mixture, the conventional curing agents are typically used, e.g., cumene hydroperoxide, benzoyl peroxide, t-butyl hydroperoxide, methyl ethyl ketone peroxide, divinyl sulfone, lead dioxide, manganese dioxide, zinc dioxide, and tellurium dioxide. Preferably, for short curing times, ammonium dichromate is used as the curing agent. Although use of the same curing agent is preferred in comparative tests to achieve the most significant data, those agents which produce essentially identical hardness data for products from the same resinous mixture, can generally be employed interchangeably.

With any of the curing agents employed following the accelerated peroxide test, elevated temperatures, i.e., above about 50° C., are used to achieve an efficient cure. For the preferred ammonium dichromate curing agent, a temperature within the range from about 65° C. to about 75° C. is typically employed for fast and economical curing. For a temperature within this range, at least about a 10 minute curing time is necessary to achieve uniform curing. Preferably, for obtaining the best comparative hardness data, the identical curing procedure is employed for preparing comparative products, although some variation can usually be tolerated. For example, with the use of the preferred ammonium dichromate, comparative materials can generally be cured at any temperature within the range of 65–75° C., inclusive. Additionally, longer curing times, e.g., about 20–30 minutes, will usually not interfere with the acquisition of significant data for comparison with data obtained from products subjected to shorter curing times, such as 10–12 minutes.

Typically, the antioxidant is simply mixed with the resin in conventional manner at room temperature, e.g., it is blended with the resin under the influence of gentle to vigorous agitation at a temperature of about 20° C. For the preferred polymercaptan resins, and for polymercaptan resin mixtures containing about 70 weight percent or more of these resins, about 0.01–4 weight percent of antioxidant, basis weight of polymercaptan resin, will provide a stabilizing amount of such antioxidant. Less than about 0.01 weight percent will usually not provide a desirable enhancement in resin stability, while greater than about 4 weight percent of antioxidant can be uneconomical. Preferably for economy and enhanced resin stability, the liquid polymercaptan contains about 0.05–2 weight percent of antioxidant.

Generally, polymercaptan resins which have achieved a viscosity of more than about 120,000 centipoises can be difficult to blend with fillers, pigments, curing agents, and/or other additional materials. For the preferred polymercaptan resins, freshly prepared resins usually have a viscosity within the range from about 1,600 to about 12,000 centipoises, and for such resins the preferred amount of antioxidant will essentially maintain the viscosity of the freshly prepared material during storage of about one to two years or longer. In addition to maintaining resin viscosity, it has often been found that the antioxidants will desirably maintain the mercaptan equivalent value of freshly prepared resin (conveniently expressed as milliequivalents of —SH groups per gram of resin). Thus, stored resin which displays an essentially unchanged mercaptan equivalent is often resin having an unsubstantial viscosity increase. However, for economy and simplicity, direct viscosity measurement for monitoring resin stability is preferred.

In addition to the resin and antioxidant, the resinous compositions can include, typically, pigments, fillers, brighteners, plasticizers, diluents, dyes, retarders, accelerators, and other resinous substances in addition to the polymercaptan resins, as well as other additives or components which can be formulated into sealing or caulking compositions.

The following examples show ways in which the invention has been practiced but should not be construed as limiting the invention. Unless otherwise specified, the parts disclosed in the examples are parts by weight and the temperatures are in degrees centigrade. Hardness data was acquired from a durometer test with the Type A instrument manufactured by the Shore Instrument and Mfg. Co., Inc., which instrument has been shown in ASTM D 676–58T, 1958 edition, part 9, page 1305. For convenience such hardness is referred to herein as the "Shore A" hardness.

EXAMPLE 1

The polymercaptan resin employed in this example is a water-white liquid having a molecular weight of about 6,000, and an SH functionality of 2.3 as measured by iodimetric titration. The resin is prepared from a propylene oxide derivative of trimethylol propane, which derivative is then reacted with epichlorohydrin, and then subsequently with sodium sulfhydrate to prepare the polymercaptan resin. This resin is divided into two 100 part portions, A and B, and to the B portion is added, with agitation, 0.2 parts of an antioxidant which is p-methoxyaniline thereby preparing a liquid solution which is ostensibly free from undissolved antioxidant.

Each portion, A and B, are then separately mixed with 0.01 part of a 30 percent strength aqueous hydrogen peroxide solution. The resulting peroxide-containing mixtures A and B are then separately heated, each at a temperature of 70° and for a time of 18 hours. Thereafter, as measured with iodimetric titration the mercaptan equivalent of the antioxidant-free A portion is found to be 0.276 milliequivalent/gm., referred to hereinafter for convenience simply as "meq./gm.," and that of the antioxidant-containing B portion is 0.325 meq./gm.

For curing there is then added 13.4 parts catalyst and thereafter 6.6 parts water to both the A portion and the B portion. The catalyst is a mixture of 100 parts of ammonium dichromate, 57 parts dioctylphthalate, and 10 parts stearic acid. Each portion is separately placed in an oven heated at 70°, and after 10 minutes each portion is removed from the oven and cooled in a constant temperature (25°) bath for one minute. Upon removal from the bath the product prepared from the antioxidant-free A portion exhibits a very poor Shore A hardness of 0 while the product prepared from the antioxidant-containing B mixture has a Shore A hardness of 11.

EXAMPLE 2

Additional polymercaptan resin employed in Example 1 is divided into three 100 part portions, designated C, D, and E, and to the E portion there is admixed 0.5 part of an antioxidant which is hydroquinone monomethyl ether. The D and E portions are modified in accordance with the peroxide procedure of Example 1 and are tested for mercaptan equivalents. The antioxidant-free D portion tests at 0.284 meq./gm. after aging at 70° for 16 hours while the antioxidant-containing E portion measures at 0.337 meq./gm. after similar aging conditions. All portions C, D, and E, are cured in the manner of Example 1.

Each cured product is then subjected to durometer testing and the cured product from the antioxidant-free portion C, which has not been subjected to the hydrogen peroxide procedure, displays a Shore A hardness of 14, which is the same reading obtained from the cured product prepared from the antioxidant-containing E portion which has been subjected to the peroxide test. By comparison, the cured product from the peroxide-tested D portion, which portion was not protected by antioxidant, exhibits a Shore A hardness of only 2.

EXAMPLE 3

Additional polymercaptan resin employed in Example 1 is divided into four 100 part portions, designated, F, G, H, and J, and to the G and J portions there is admixed 2 parts of an antioxidant which is 2,6-di-tert-butyl-p-cresol. The F and G portions are then cured in the manner of Example 1 and the cured product from both the antioxidant-free F portion and the antioxidant-containing G portion exhibit Shore A hardness of 15. The H and J portions are then separately maintained for three weeks at a temperature of 70° under atmospheric air. After three weeks both the H portion and the J portion are cured in the manner of Example 1 and the cured product from the antioxidant-free H portion exhibits an undesirable Shore A hardness of only 4, while the cured product from the antioxidant-containing J portion exhibits a very good Shore A hardness of 13.

EXAMPLE 4

Four equal weight portions of 100 parts each are prepared from additional polymercaptan resin of Example 1. For convenience, these portions are designated A, B, C, and D and to both the B portion and the D portion there is separately added 1 part of 2,6-di-tert-butyl-p-cresol. The A and C portions are then cured in the manner of Example 1 and the resulting products from both the antioxidant-free A portion and the antioxidant-containing B portion exhibit Shore A hardness of 15.

The C and D portions are then separately maintained for four weeks at a temperature of 70° under a nitrogen atmosphere containing less than 5 p.p.m. of gaseous oxygen. After four weeks both the C and D portions are cured in the manner of Example 1 and subsequently the cured product from the antioxidant-free C portion exhibits an undesirable Shore A hardness of only 5, while the cured product from the antioxidant-containing D portion exhibits an excellent Shore A hardness of 14.

EXAMPLE 5

Additional polymercaptan resin of Example 1 is divided into two aliquot portions of 100 parts each and to one portion there is added 0.5 parts of 2,6-di-tert-butyl-p-cresol antioxidant. Each portion is then separately mixed with 100 parts of calcium carbonate filler having an average particle size of 0.05 micron. Each portion is then blended with 15 parts of catalyst which is a mixture of 50 weight percent lead peroxide, 45 weight percent dioctylphthalate, and 5 weight percent triple pressed stearic acid. Each portion is then cured in a separate, shallow mold at a temperature of 70° for a time of 24 hours thereby preparing a cast panel from each portion.

The two panels are clamped to the circular rack of a weatherometer, which rack rotates at 1 r.p.m. The specimens are subjected to a source of light with heat at 145° F., which source provides uniform distribution of radiation on both specimens. Water is prayed on the specimens to provide the following operating conditions: 102 minutes of heat and light, 18 minutes of light and water spray.

The above cycle is repeated for 21 days after which time the two panels are removed from the machine and visually inspected. The panel prepared from the antioxidant-free resinous composition shows heavy chalking, and upon brushing exhibits a visible surface crazing. The panel prepared from the antioxidant-containing mixture is essentially chalk free and is ostensibly free from surface crazing.

EXAMPLE 6

Further polymercaptan resin of Example 1 is divided into two aliquot portions of 100 parts each and to one portion there is blended 2 parts of 2,6-di-tert-butyl-p-cresol. Each portion has a viscosity of 4,800 centipoises at 25° as measured by a No. 6 spindle at 100 r.p.m. on a Brookfield viscosimeter.

The two portions of resin are then placed in separate, open containers and each container is stored, exposed to the air, at a temperature of 75° F., for a time of four weeks. Viscosity measurements, conducted as described hereinbefore after the four weeks' storage, show a marked increase in viscosity to 7,570 centipoises for antioxidant-free resin and a desirably suppressed increase in viscosity to only 5,550 centipoises for the antioxidant-containing resin, thus demonstrating the excellent ability of the antioxidant to maintain pre-storage resin viscosity for storage conditions affecting a deleterious viscosity increase in antioxidant-free resin.

While certain representative embodiments and details have been shown for the purpose of illustrating the invention, it will be apparent to those skilled in the art that various changes and modifications may be made therein without departing from the spirit or the scope of the invention.

What is claimed is:

1. A liquid resinous composition comprising a polymercaptan resin prepared from a propylene oxide derivative of trimethylol propane which derivative is then reacted with epichlorohydrin and sodium sulfhydrate, said resin having a molecular weight of about 800–10,000 and an SH functionality of 2 to about 10, and a stabilizing amount of an aromatic antioxidant selected from the group consisting of di-$\beta$-naphthyl-p-phenylene diamine; p-benzoquinone; halo, phenyl, hydroxy and alkyl substituted p-benzoquinones; and compounds corresponding to the formula:

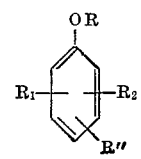

wherein R is hydrogen or methyl and $R_1$, $R_2$, and $R_3$ are hydrogen, hydroxyl, alkoxy, phenoxy, amino, hydroxyalkyl, carboalkoxy, carboxyl, alkyl, dialkylamino, acylamido, and not more than one radical corresponding to the formula:

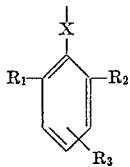

wherein X is alkylene or thio and $R_1$, $R_2$ and $R_3$ are as defined above.

2. The composition of claim 1 wherein said aromatic antioxidant corresponding to said formula is selected from the group consisting of 2,6-di-tert-butyl-p-cresol, 2,2'-thiobis (4-methyl-6-tert-butyl phenol), hydroquinone, 2,2'-methylene bis (4-methyl-6-tert-butyl phenol), 2,6-di-tert-butyl phenol, 2,6-di-tert-butyl-α-dimethylamino-p-cresol, 2,6-di-tert-butyl-α-methoxy-p-cresol, p-methoxyaniline, N-acetyl-p-aminophenol, N-butyryl-p-aminophenol, N-lauroyl-p-aminophenol, N-stearoyl-p-aminophenol, 2,4-dimethyl-6-tert-butylphenol, p-tert-butylphenol, 6-tert-butyl-2,4-xylenol, 2,6-di-tert-butyl-4-hydroxymethylphenol, methoxybenzene, hydroquinone monobenzyl ether, and hydroquinone monomethyl ether.

3. The composition of claim 1 wherein said ring substituted p-benzoquinone is selected from the group consisting of 2,6-dichloro-p-benzoquinone, trichloro-p-benzoquinone, tetrachloro-p-benzoquinone, 6-bromo-2-methyl-p-benzoquinone, 2,5-dihydroxy-p-benzoquinone, tetrahydroxy-p-benzoquinone, 2-methyl-p-benzoquinone, 2,3-dimethyl-p-benzoquinone, 2,5-dimethyl-p-benzoquinone, 2,6-dimethyl-p-benzoquinone, tetramethyl-p-benzoquinone, and 2,5-diphenyl-p-benzoquinone.

4. The composition of claim 1 wherein said polymercaptan resin contains between about 0.01–4 weight percent of said aromatic antioxidant.

5. The composition of claim 1 wherein said polymercaptan resin has an SH functionality greater than two and less than about 10, and said aromatic antioxidant has a boiling point above about 100° C. at a pressure of 760 mm. Hg absolute.

6. The composition of claim 1 wherein cured product from a mixture of said resinous composition pretreated with 30 percent strength aqueous hydrogen peroxide retains at least about 50 percent of the hardness exhibited by cured product from peroxide-free resinous composition, and wherein the weight proportion of resinous composition to hydrogen peroxide in the peroxide-containing mixture is between about 50:0.01 to about 33:0.01.

References Cited
UNITED STATES PATENTS

| | | | |
|---|---|---|---|
| 2,831,830 | 4/1958 | Schroeder | 260—79 X |
| 2,992,210 | 7/1961 | Gluckman | 260—79 X |
| 3,000,865 | 9/1961 | Gurgiolo | 260—79 |
| 3,078,283 | 2/1963 | Hay | 260—45.7 X |
| 3,242,132 | 3/1966 | Geigle | 260—45.9 X |
| 3,278,484 | 10/1966 | Tesoro | 260—79.1 X |
| 3,296,186 | 1/1967 | Gunkel | 260—45.7 |
| 3,305,536 | 2/1967 | Warner | 260—79.7 |

DONALD E. CZAJA, *Primary Examiner.*

M. J. WELSH, *Assistant Examiner.*